US010649492B2

United States Patent
Peters et al.

(10) Patent No.: US 10,649,492 B2
(45) Date of Patent: May 12, 2020

(54) MOUNT FOR HANDHELD ELECTRONIC DEVICES

(71) Applicant: ANNEX PRODUCTS PTY. LTD., Prahran (AU)

(72) Inventors: Christopher Peters, Prahran (AU); Leigh Ryan, Sandringham (AU)

(73) Assignee: ANNEX PRODUCTS PTY. LTD., Prahran (AU)

( * ) Notice: Subject to any disclaimer, the term of this patent is extended or adjusted under 35 U.S.C. 154(b) by 64 days.

(21) Appl. No.: 15/994,536

(22) Filed: May 31, 2018

(65) Prior Publication Data
US 2019/0369664 A1  Dec. 5, 2019

(51) Int. Cl.
| G06F 1/16 | (2006.01) |
| F16B 47/00 | (2006.01) |
| F16M 13/02 | (2006.01) |
| F16M 11/00 | (2006.01) |
| B60R 11/00 | (2006.01) |
| A45D 42/14 | (2006.01) |
| A45C 11/00 | (2006.01) |
| F16M 11/04 | (2006.01) |

(52) U.S. Cl.
CPC .......... *G06F 1/1632* (2013.01); *F16B 47/006* (2013.01); *F16M 13/022* (2013.01); *A45C 2011/002* (2013.01); *B60R 2011/0056* (2013.01); *B60R 2011/0068* (2013.01); *F16M 11/041* (2013.01)

(58) Field of Classification Search
CPC .... G06F 1/1632; F16B 47/005; F16B 47/006; F16M 13/022; A45C 2011/002; B60R 2011/0056; B60R 2011/0068
See application file for complete search history.

(56) References Cited

U.S. PATENT DOCUMENTS

| 3,675,886 A | 7/1972 | Kampmier |
| 5,087,005 A | 2/1992 | Holoff et al. |
| 5,964,437 A | 10/1999 | Belokin et al. |
| 6,213,521 B1 | 4/2001 | Land et al. |
| 6,666,420 B1 | 12/2003 | Carnevali |
| 6,669,033 B1 | 12/2003 | Lian |
| 6,913,232 B2 | 7/2005 | Richter |
| 6,942,188 B2 | 9/2005 | Tsay et al. |

(Continued)

FOREIGN PATENT DOCUMENTS

| CN | 203809437 U | 9/2014 |
| CN | 205001297 U | 9/2014 |
| KR | 200377613 U | 3/2005 |

OTHER PUBLICATIONS

Ailun, Car Phone Mount, Magnet Key Holder accessed at: https://www.amazon.com/dp/B074RG7N4J/?tag=entrusters-20 (available prior to the filing of the present application).

(Continued)

*Primary Examiner* — Tan Le
(74) *Attorney, Agent, or Firm* — Barnes & Thornburg LLP

(57) ABSTRACT

A mount includes a frame, a head coupled to a first end of the frame, a suction cup positioned at an opposite second end of the frame, and a suction-cup activator. Rotational movement of the suction-cup activator causes a corresponding axial moment of the suction cup for attaching the mount to a surface. The head allows attachment of a handheld electronic device to the mount.

17 Claims, 6 Drawing Sheets

(56) References Cited

U.S. PATENT DOCUMENTS

| | | | |
|---|---|---|---|
| 6,966,530 B2 | 11/2005 | Hsu | |
| 7,178,771 B2 | 2/2007 | Richter | |
| 7,241,069 B2 | 7/2007 | Richter | |
| 7,293,750 B2 | 11/2007 | Richter | |
| D560,592 S | 1/2008 | Brassard | |
| 7,344,114 B2 | 3/2008 | Richter | |
| 7,357,361 B2 | 4/2008 | Yen | |
| 7,431,250 B2 | 10/2008 | Chen | |
| 7,455,269 B1 * | 11/2008 | Chien | F16B 47/006 248/205.8 |
| D587,188 S | 2/2009 | Mo | |
| 7,607,622 B2 | 10/2009 | Carnevali | |
| 7,661,648 B2 | 2/2010 | Lin | |
| D613,731 S | 4/2010 | Yeo | |
| 7,850,133 B2 | 12/2010 | Carnevali | |
| 7,913,963 B2 * | 3/2011 | Cheng | B60R 11/02 248/205.5 |
| D638,008 S | 5/2011 | Richter | |
| 7,975,971 B2 | 7/2011 | Carnevali | |
| D645,462 S | 9/2011 | Choi | |
| D655,282 S | 3/2012 | Richter | |
| 9,145,913 B2 * | 9/2015 | Song | A42B 3/006 |
| 9,229,494 B2 | 1/2016 | Rayner | |
| 9,243,739 B2 | 1/2016 | Peters | |
| 9,664,227 B2 * | 5/2017 | Huang | F16B 47/006 |
| 2008/0251664 A1 * | 10/2008 | Hara | F16B 47/00 248/205.8 |
| 2011/0088202 A1 | 4/2011 | McLuckie et al. | |
| 2011/0127395 A1 * | 6/2011 | Ostendarp | F16B 47/006 248/205.8 |
| 2012/0321852 A1 | 12/2012 | Bodziak et al. | |
| 2014/0191096 A1 | 7/2014 | Wiercinski et al. | |
| 2014/0359933 A1 * | 12/2014 | Linehan | A47K 17/022 4/576.1 |

OTHER PUBLICATIONS

IPad Case for Car Headrest, Studio Proper, accessed on-line at: www.studioproper.com/products/headrest-mount (available prior to the filing of the present application).

IPad POS Pivot Table Stand and Wall Mount, Studio Proper, accessed on-line at: https://www.studioproper.com/products/pos-pivot?gclid=EAlalQobChMI6ZSglYaz2QIVWLXACh3fDwQzEAQYBiABEgJ_nvD_BwE# (available prior to the filing of the present application).

IPad Pro Case 9.7, Studio Proper, accessed on-line at: www.studioproper.com/products/ipad-pro-case-9-7 (available prior to filing of the present application).

IPhone Magnetic Car Mount, Studio Proper, accessed on-line at: www.studioproper.com/products/iphone-car-mount (available prior to filing of the present application).

Quad Lock—Mounts, Annex Products Pty Ltd., accessed on-line at: www.quadlockcase.com/collections/shop-mounts (available prior to filing of the present application).

Windshield Suction Mount, Rokform, accessed on-line at: https://www.rokform.com/products/v3-suction-mount, (available prior to filing of the present application).

Search Report & Written Opinion issued in App. No. PCT/AU2019/050515 (2019).

* cited by examiner

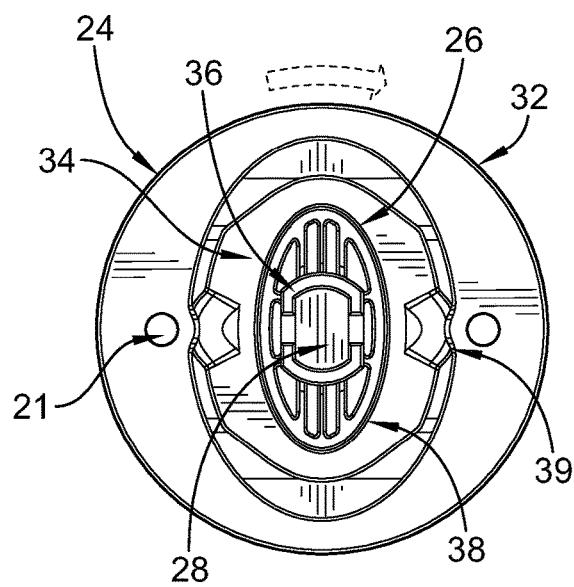
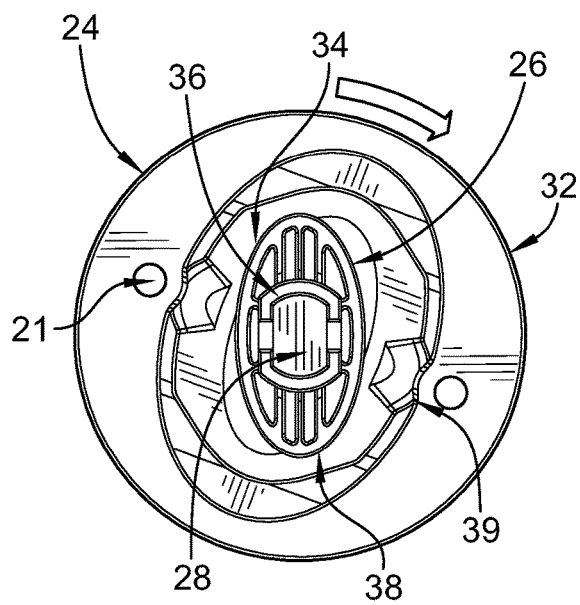
FIG. 7　　　　　　　　FIG. 8
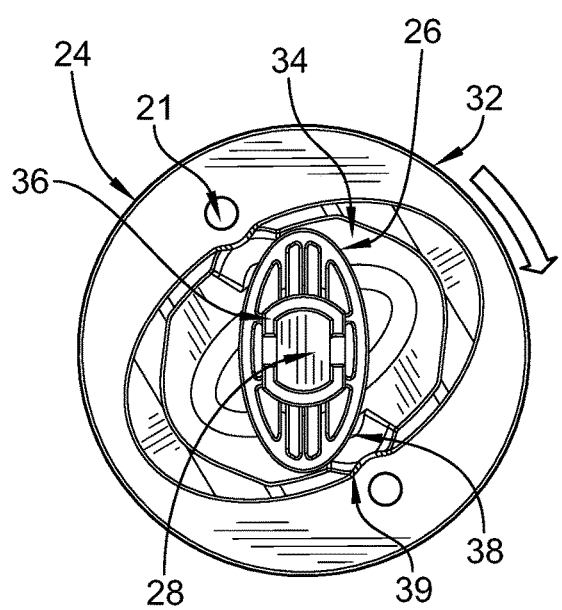
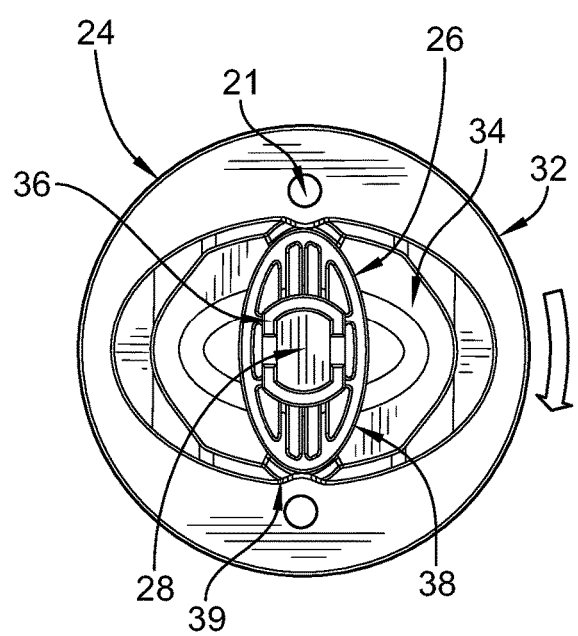
FIG. 9　　　　　　　　FIG. 10

MOUNT FOR HANDHELD ELECTRONIC DEVICES

BACKGROUND

The present disclosure relates to a mount, and particularly to a mount for handheld electronic devices. More particularly, the present disclosure relates to a mount for positioning a handheld electronic device relative to a surface.

SUMMARY

A mount in accordance with the present disclosure includes a frame, a head coupled to a first end of the frame, a suction cup positioned at an opposite second end of the frame, and a suction-cup activator coupled to the frame and engaged with the suction cup. Rotational movement of the suction-cup activator causes a corresponding axial moment of the suction cup for attaching the mount to a surface. The head allows attachment of a handheld electronic device to the mount.

In illustrative embodiments, the suction-cup activator includes a grip, a lifter coupled to the grip for rotation with the grip, a cam, and a stem coupled between the suction cup and the cam. The cam engages with the lifter to translate rotational movement of the grip and lifter into axial movement of the stem. The suction-cup activator is movable from an unlocked position to a locked position relative to the frame to drive the suction cup towards frame and form a suction bond with the surface.

In illustrative embodiments, the cam is received in a bowl of the lifter when the suction-cup activator is in the unlocked position. A face of the cam rides along the bowl with rotation of the lifter and engages with seats of the lifter to hold the suction-cup activator in the locked position at the selection of a user. The suction cup lies substantially flat when the suction-cup activator is in the unlocked position and the stem pulls a central portion of the suction cup into the frame when the suction-cup activator is moved to the locked position.

In illustrative embodiments, the frame includes a front frame-member, a rear frame-member, and a base. The base is received in a cavity of the rear frame-member and includes a rim, a cap wall extending from the rim, and slots formed through the cap wall and circumferentially spaced apart from one another. The suction cup includes a disk, a pocket coupled to the disk for holding the stem relative to the suction cup, and flanges extending from the disk and circumferentially spaced apart from one another. The flanges on the disk engage with the slots of the base to block rotation of the suction cup relative to the frame. The stem extends through a guide of the base that blocks rotation of the stem relative to the frame.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures, and like reference characters designate the same or similar parts throughout the figures, of which:

FIGS. 7-10 are a series of views showing illustrating rotation of the lifter relative to the cam as the suction-cup activator moves from the unlocked position to the locked position;

The exemplification set out herein illustrates embodiments of the disclosure that are not to be construed as limiting the scope of the disclosure in any manner Additional features of the present disclosure will become apparent to those skilled in the art upon consideration of the following detailed description of illustrative embodiments exemplifying the best mode of carrying out the disclosure as presently perceived.

DETAILED DESCRIPTION

Figure 1:
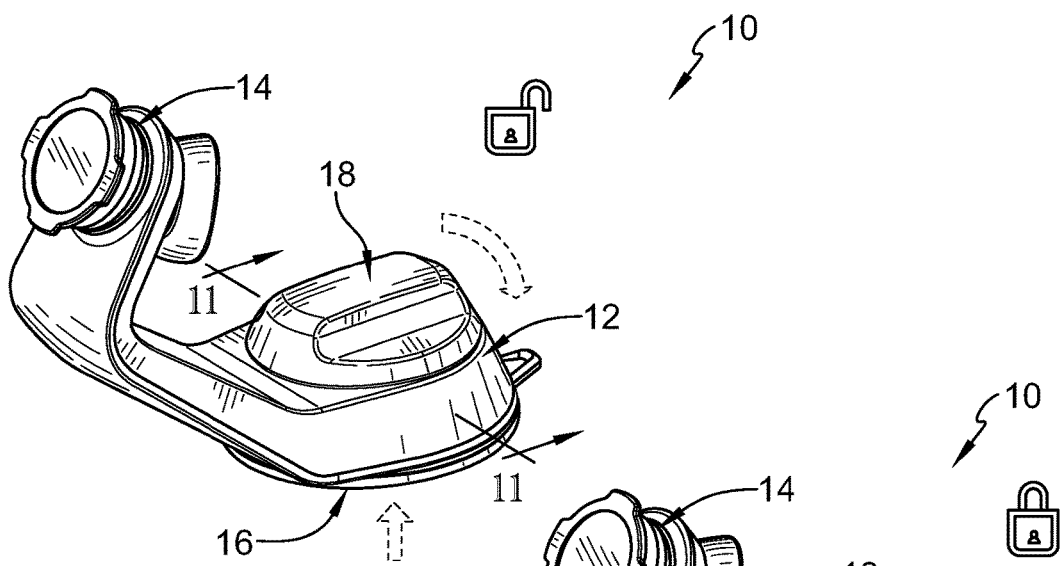
FIG. 1 is a perspective view of a mount in accordance with the present disclosure showing that the mount includes a frame, a head coupled to a first end of the frame, a suction cup positioned at an opposite second end of the frame, and a suction-cup activator and suggesting that rotational movement of the suction-cup activator causes a corresponding axial moment of the suction cup for attaching the mount to a surface.
Figure 2:
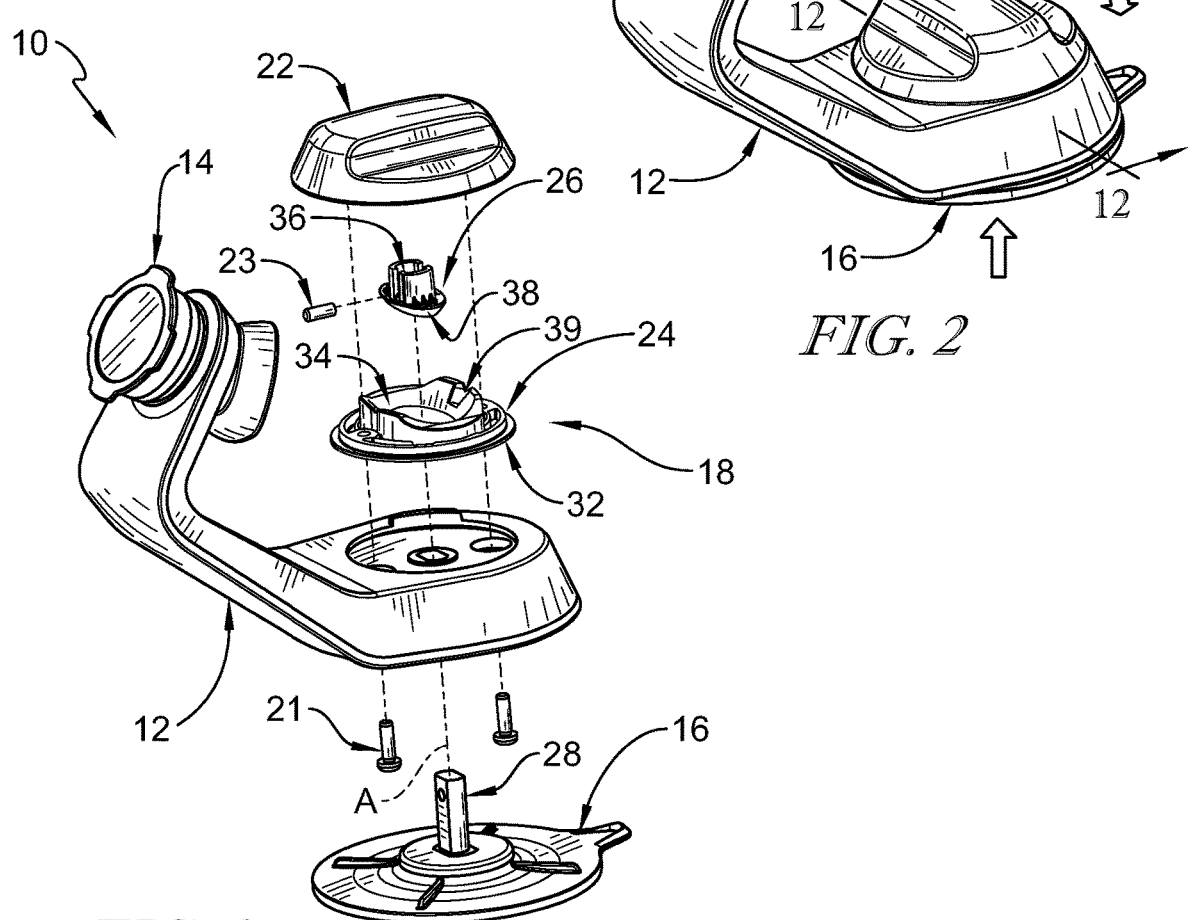
FIG. 2 is a view similar to FIG. 1 showing the suction-cup activator rotated from an unlocked position, as shown in FIG. 1, to a locked position relative to the frame to drive the suction cup towards frame.

A mount 10 in accordance with the present disclosure is shown in FIG. 1. Mount 10 includes a frame 12, a head 14 coupled to a first end of frame 12, a suction cup 16 positioned at an opposite second end of frame 12, and a suction-cup activator 18. Rotational movement of suction-cup activator 18 causes a corresponding axial moment of suction cup 16, as suggested in FIGS. 1 and 2, for attaching mount 10 to a surface 200. Surface 200 may be a surface of a vehicle windshield or dashboard or any other suitable surface. In the illustrative embodiment, head 14 allows attachment of a case 100 for a handheld electronic device to be attached to mount 14 for positioning the handheld electronic device relative to surface 200. Mount 10 may have any other suitable construction in accordance with other embodiments of the present disclosure.

Figure 3:
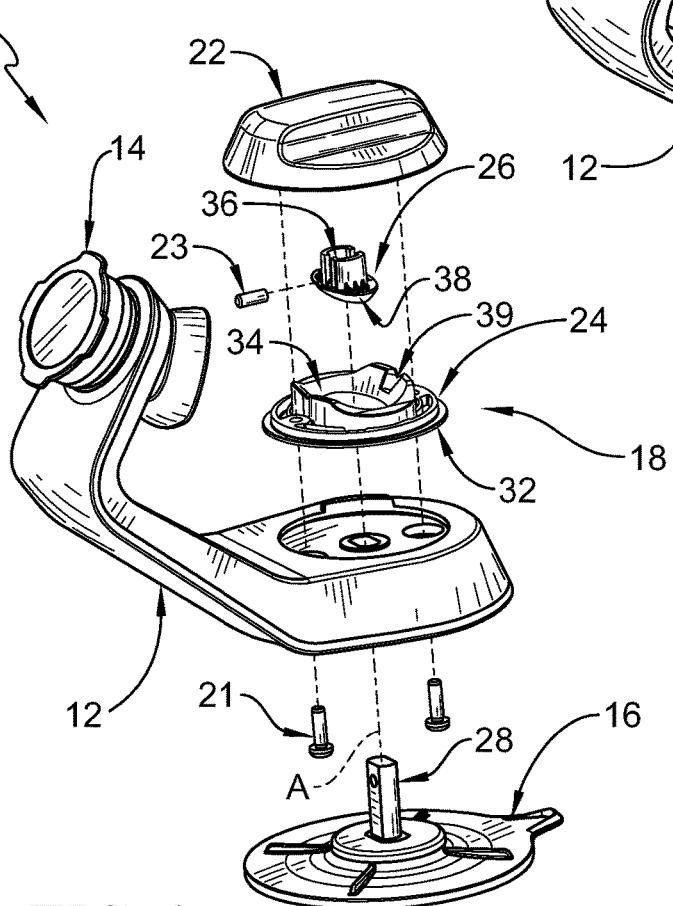
FIG. 3 is an exploded assembly view of the suction-cup activator of FIG. 1 showing that the suction-cup activator includes a grip, a lifter coupled to the grip for rotation with the grip, a cam, and a stem coupled between the suction cup and the cam and suggesting that the cam engages with the lifter to translate rotational movement of the grip and lifter into axial movement of the stem.
Figure 4:
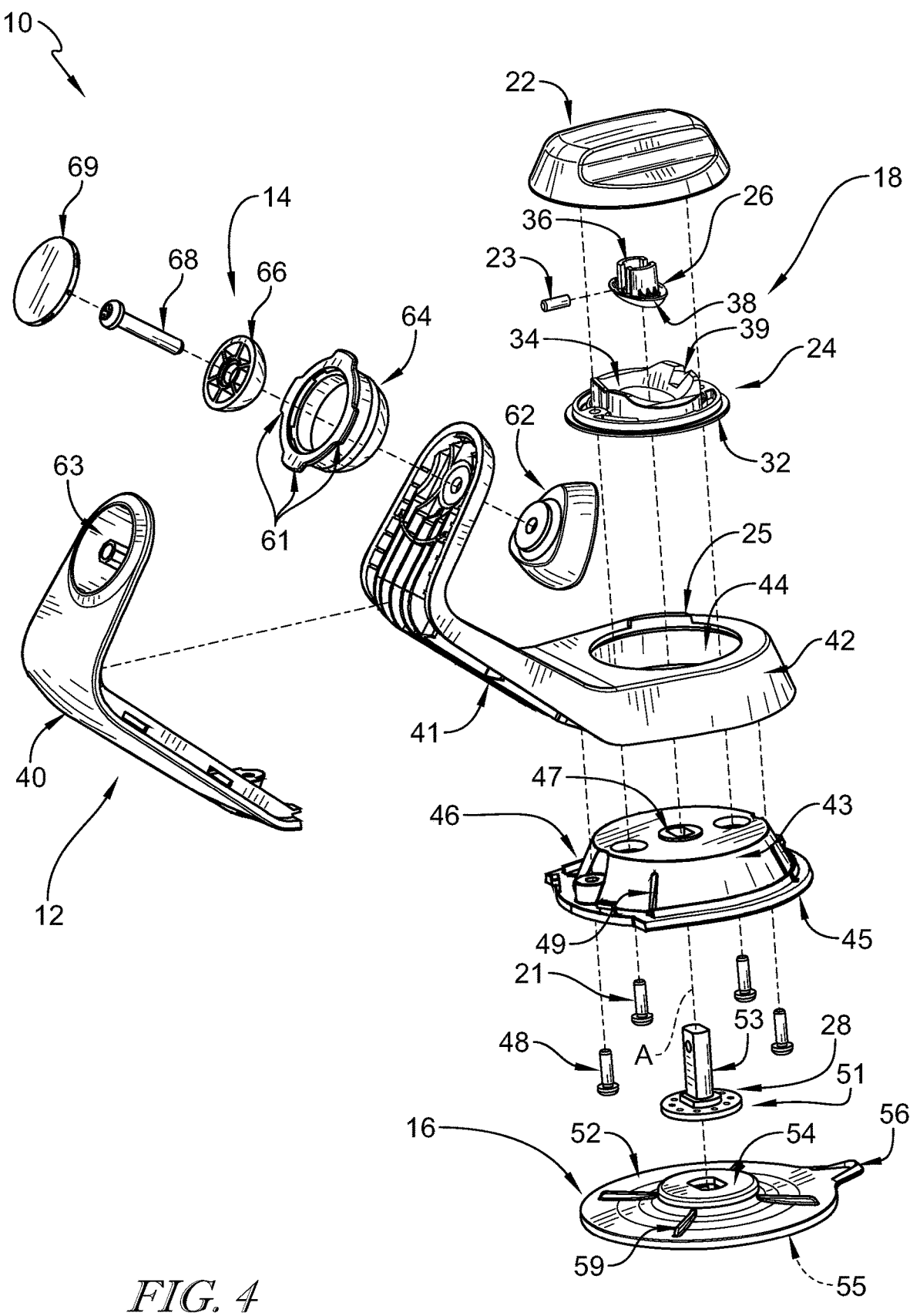
FIG. 4 is an exploded assembly view of the mount of FIG. 1.

Suction-cup activator 18 includes a grip 22, a lifter 24 coupled to grip 22 for rotation with grip 22, a cam 26, and a stem 28 coupled between suction cup 16 and cam 26 as shown in FIGS. 3 and 4. A pin 23 connects cam 26 with stem 28. In some embodiments, a fastener, snap fit, press fit, detent, adhesive, welding, or other method is used for attaching cam 26 with stem 28. Cam 26 engages with lifter 24 to translate rotational movement of grip 22 and lifter 24 into axial movement of stem 28 along an axis A. Suction-cup activator 18 is movable from an unlocked position (shown in FIG. 1) to a locked position (shown in FIG. 2) relative to frame 12 to drive suction cup 16 towards frame 12 and form a suction bond with surface 200.

Lifter 24 includes a support plate 32 and a bowl 34 coupled to support plate 34 as shown in FIGS. 3 and 4. One or more seats 39 are formed into bowl 34. Cam 26 includes a channel 36 and a face 38 coupled to channel 36. Pin 23 is received in channel 36 and extends through stem 28 to connect stem 28 with cam 26. Fasteners 21 connect lifter 24 with grip 22 such that lifter 24 and grip 22 rotate with one another.

Bowl 34 of lifter 24 is formed to define a non-circular, sloped inner surface as shown in FIGS. 3 and 4. In the illustrative embodiment, the inner surface of bowl 34 has an oblong, frustoconical shape. Face 38 of cam 26 is formed to define a non-circular, sloped outer surface (complementary to the inner surface of bowl 34). In the illustrative embodiment, the outer surface of face 38 has an oblong, frustoconical shape. The outer surface of face 38 engages with the inner surface of bowl 34 to translate rotational movement of lifter 24 into axial movement of cam 26 as suggested in FIGS. 5-10. In some embodiments, bowl 34 and face 38 define other complementary non-circular, sloped surfaces, such as triangular, square, and other geometrical and non-geometrical shapes. Suction cup activator 18 may have any other suitable construction in accordance with other embodiments of the present disclosure.

Frame 12 includes a front frame-member 40, a rear frame-member 41, and a base 46 as shown in FIG. 4. Base 46 is received in a cavity 44 defined by a body 42 of rear frame-member 41. Base 46 includes a rim 45, a cap wall 43 extending from rim 45, and slots 49 formed through cap wall 43 and circumferentially spaced apart from one another. Frame 12 may have any other suitable construction in any other suitable manner in accordance with other embodiments of the present disclosure.

Suction cup 16 includes a disk 52, a pocket 54 coupled to disk 52 for holding stem 28 relative to suction cup 16, and flanges 59 extending from disk 52 and circumferentially spaced apart from one another as shown in FIG. 4. Flanges 59 on disk 52 engage with slots 49 of base 46 to block rotation of suction cup 16 relative to frame 12. A flap 56 is coupled to disk 52 to aid a user in removing mount from surface 200 after movement of suction-cup activator 18 from the locked position to the unlocked position. In the illustrative embodiment, an adhesive strip 55 is coupled to disk 52 to aid in attachment of suction cup 16 with surface 200. Suction cup 16 may have any other suitable construction in accordance with other embodiments of the present disclosure.

Stem 28 includes a foot 51 and a post 53 extending from foot 51 as shown in FIG. 4. Foot 51 is received in pocket 54 of suction cup 16 to couple stem 28 with suction cup 16. Post 53 extends through a guide 47 of base 46 having a complementary, non-circular contour that blocks rotation of stem 28 relative to frame 12. Fasteners 48 connect base 46 with front frame-member 40 and rear frame-member 41.

Figure 5:
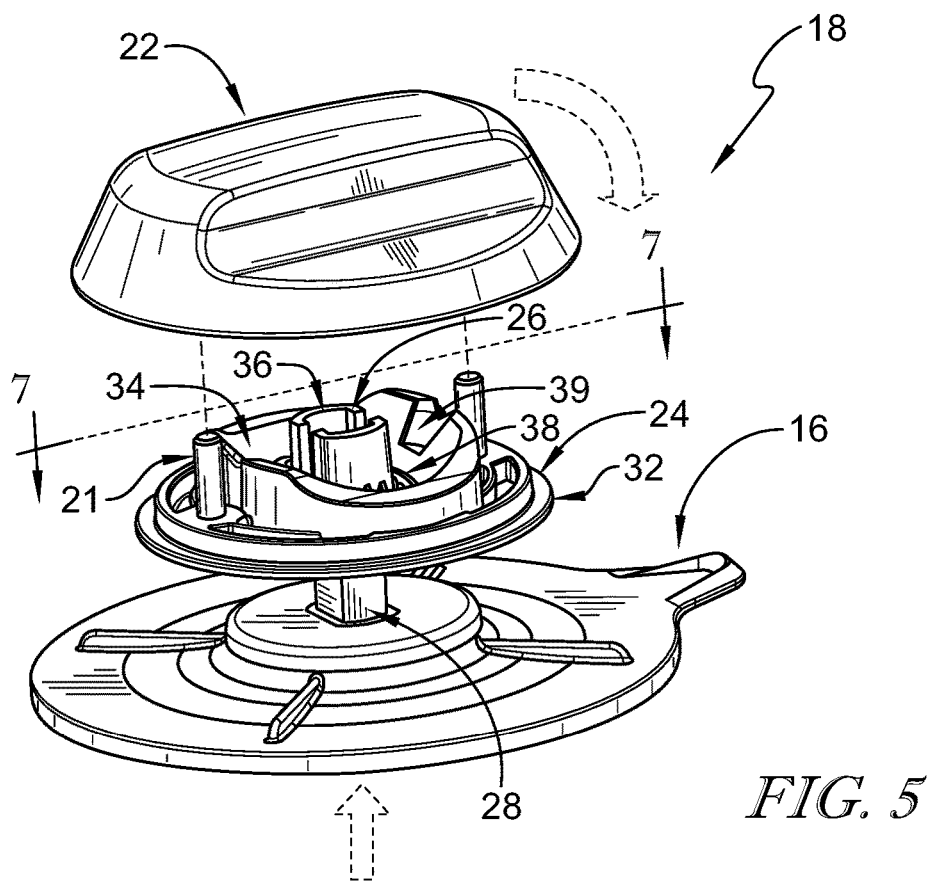
FIG. 5 is a perspective view of the suction-cup activator of FIG. 1 showing that the cam is received in a bowl of the lifter when the suction-cup activator is in the unlocked position.
Figure 6:
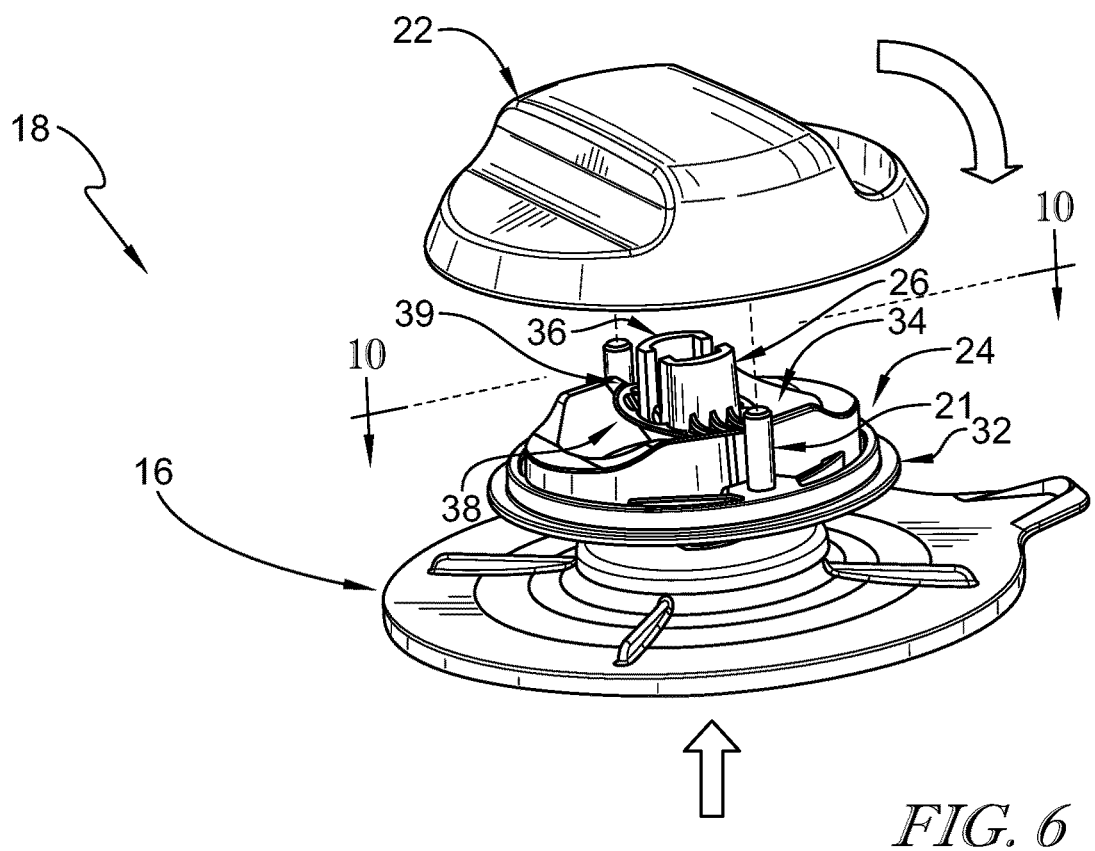
FIG. 6 is a similar view to FIG. 5 showing the suction-sup activator in the locked position and suggesting that a face of the cam rides along the bowl with rotation of the lifter and engages with seats of the lifter to hold the suction-cup activator in the locked position at the selection of a user.

Cam 26 is received in bowl 34 of lifter 24 when suction-cup activator 18 is in the unlocked position as shown in FIG. 5. Face 38 of cam 26 rides along the inner surface of bowl 34 with rotation of lifter 24 and engages with seats 39 to hold suction-cup activator 18 in the locked position at the selection of a user as suggested in FIGS. 6-10. In some embodiments, ribs, bumps, snap details, spring-loaded devices, or other features are used in addition to or in place of seats 39 for holding suction-cup activator 18 in the locked position at the selection of a user. A rotation stop 25 coupled to frame 12 (shown in FIG. 4) engages with grip 22 to limit rotation of grip 22 between the unlocked and locked positions. In some embodiments, grip 22 and lifter 24 can rotate about 90 degrees relative to frame 12 from unlocked position to the locked position.

Figure 11:
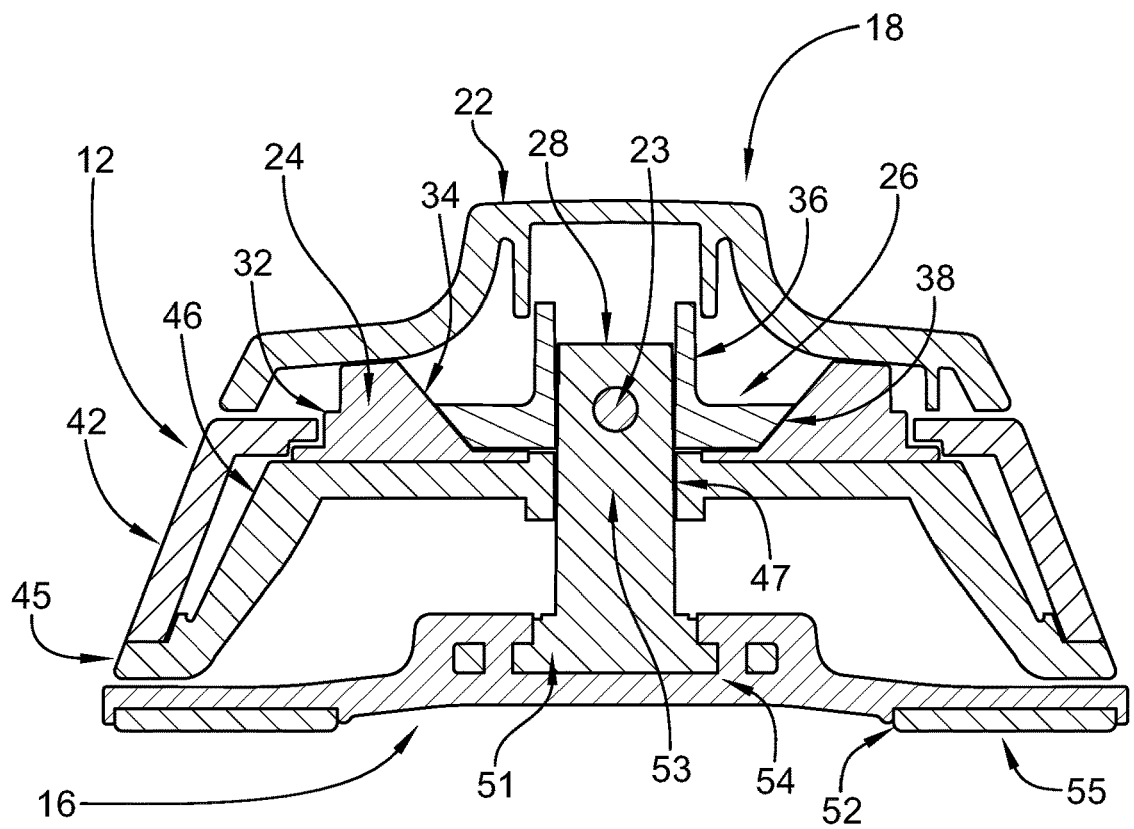
FIG. 11 is a sectional view taken along line 11-11 in FIG. 1 showing that the suction cup lies substantially flat when the suction-cup activator is in the unlocked position.
Figure 12:
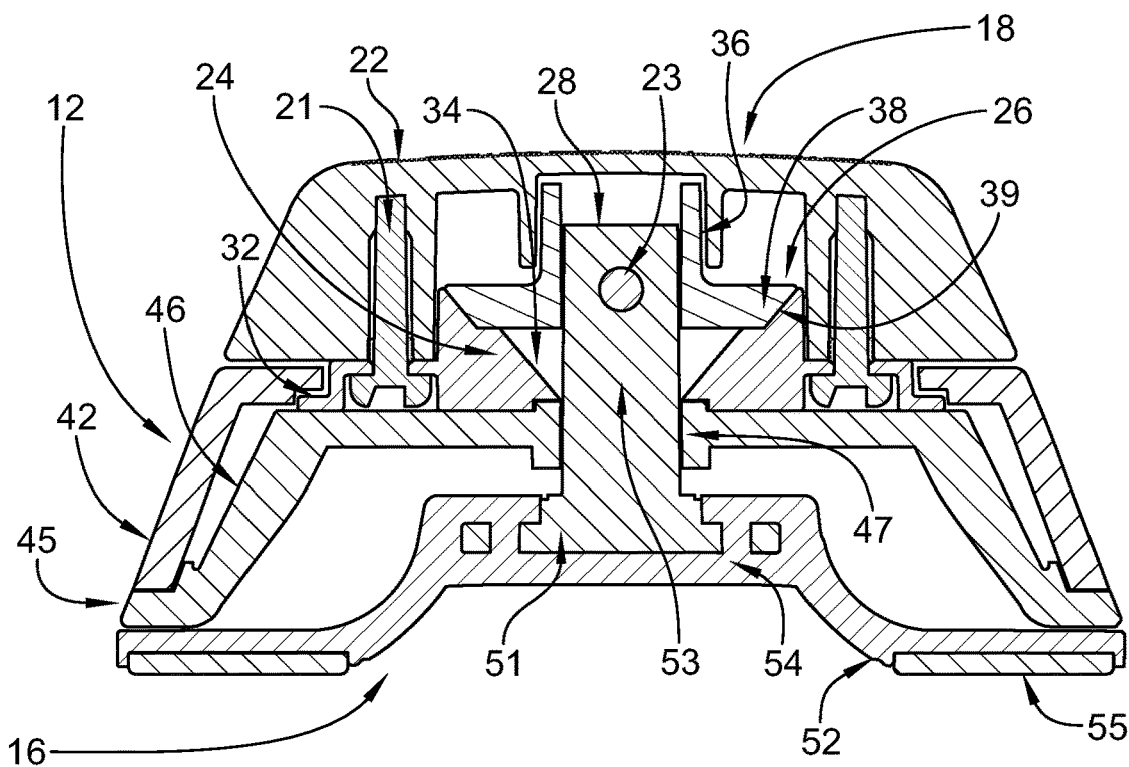
FIG. 12 is a sectional view taken along line 12-12 in FIG. 2 showing that the stem pulls a central portion of the suction cup into the frame when the suction-cup activator is moved to the locked position.

Suction cup 16 lies substantially flat when suction-cup activator 18 is in the unlocked position as shown in FIG. 11. An outer perimeter edge of disk 52 engages with rim 45 and stem 28 pulls central portions of suction cup 16 into frame 12 when suction-cup activator 18 is moved to the locked position as shown in FIG. 12. Lifter 24 is supported on base 46 against the bias of suction cup 16 pulling stem 28 and cam 26 toward rim 45. A suction bond is formed with mating surface 200 as suction cup 16 is pulled into frame 12 for attaching mount 10 to surface 200.

Figure 13:
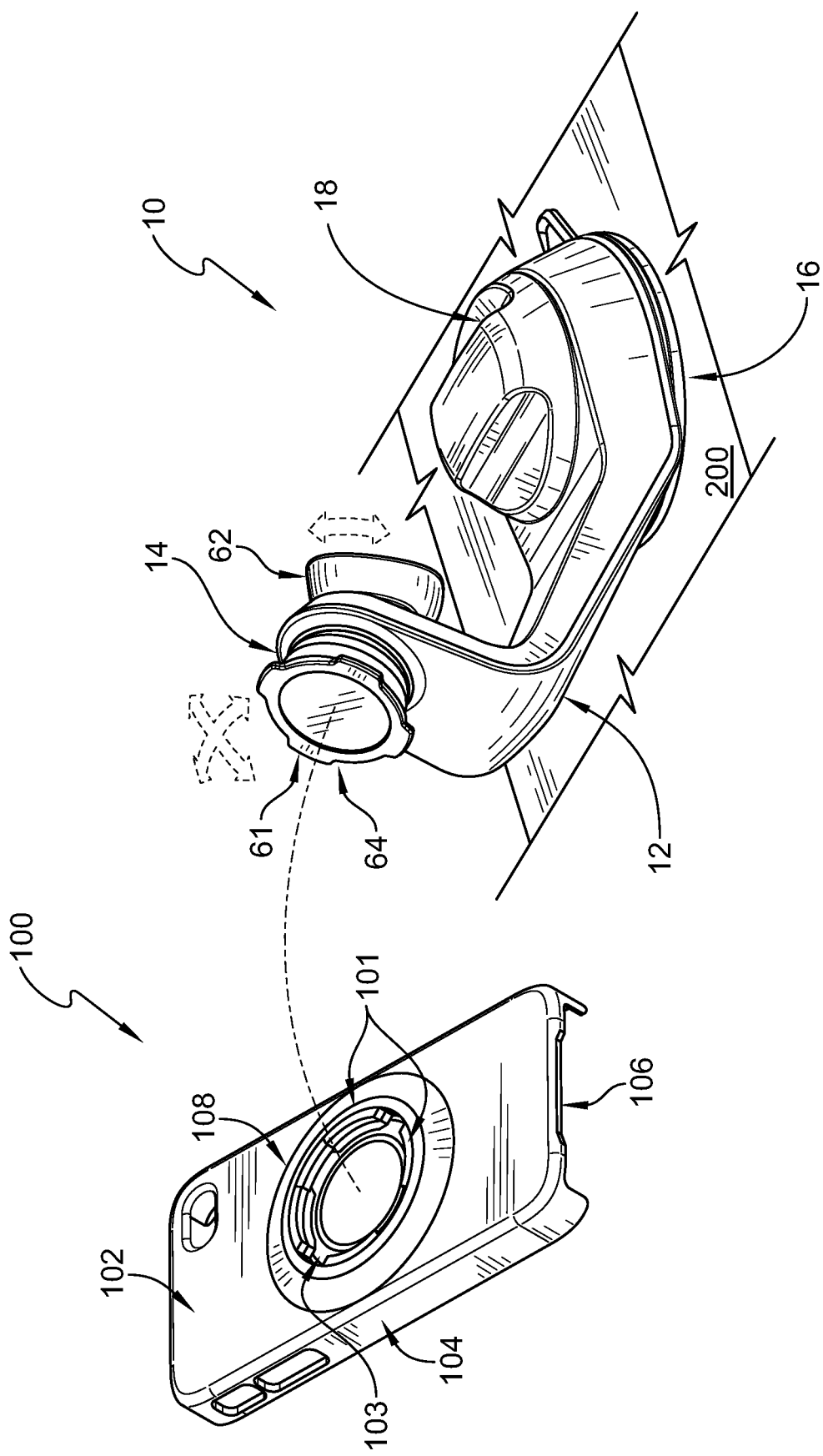
FIG. 13 is a view similar to FIG. 2 showing the mount coupled to a surface and suggesting that the head of the mount engages with a receiver of a case for a handheld electronic device for attaching the handheld electronic device to the mount.

Head 14 of mount 10 includes a knob 62, a gimbal 64, and a clamp 66 as shown in FIG. 4. Gimbal is received in a socket 63 of frame 12 and clamp 66 is received inside gimbal 64. A fastener 68 extends through clamp 66, gimbal 64, and socket 63 to engage with knob 62. A closure 69 engages with gimbal 64 to cover clamp 66. Rotation of knob 62 moves clamp 66 relative to socket 63 to block or allow movement of gimbal 64 relative to frame 12 at the selection of a user as suggested in FIG. 13.

Case 100 includes a rear wall 102 and a perimeter wall 104 defining an interior space 106 for attachment with a handheld electronic device, such as a smartphone, tablet, GPS unit, or monitor for example. A receiver 108 is formed in rear wall 102 and includes a series of case tabs 101 separated by gaps 103. A series of mount tabs 61 extend outward from gimbal 64 for engagement with case tabs 101 to attach case 100 (including the handheld electronic device stored therein) with mount 10. Mount tabs 61 pass through gaps 103 and case 100 is rotated relative to mount 10 to engage mount tabs 61 with case tabs 101. Case 100 may be constructed in any other suitable manner and may engage the head 14 in any other suitable manner in accordance with other embodiments of the present disclosure.

In illustrative embodiments, frame 12, head 14, and suction-cup activator 18 can be formed from various rigid materials, such as thermoplastic polymers, metals, and metal alloys, among others. In illustrative embodiments, suction cup 16 can be formed of resilient, deformable materials such as thermoset polymers and natural rubbers, among others.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

The invention claimed is:

1. A mount comprising:
   a frame having a first end and a spaced apart second end;
   a head coupled to the first end of the frame, the head adapted to attached with a case of a handheld electronic device;
   a suction cup positioned at the second end of the frame; and
   a section-cup activator coupled to the second end of the frame and to the suction cup, the suction-cup activator including a lifter engaged with the frame, a cam engaged with the lifter, and a stem coupled to the suction cup and to the cam along an axis,
   wherein the lifter and the cam are each formed to define complementary non-circular, sloped surfaces configured to engage with one another to translate rotation of the lifter into axial movement of the cam and stem relative to the frame to drive the suction cup toward the frame as the lifter rotates from an unlocked position to a locked position,
   wherein the suction cup includes a disk and a flange extending from the disk, wherein the frame includes a slot, and wherein the flange engages with the slot to block rotation of the suction cup relative to the frame.

2. The mount of claim 1, wherein a guide is formed through the frame, wherein the stem at least partially extends through the guide, and wherein the guide and the stem are formed to define complementary non-circular contours that engage with one another to block rotation of the stem relative to the frame.

3. The mount of claim 2, wherein the stem includes a foot and a post extending from the foot, and wherein the foot is received in a pocket of the suction cup.

4. A mount comprising:
   a frame having a first end and a spaced apart second end;
   a head coupled to the first end of the frame, the head adapted to attached with a case of a handheld electronic device;
   a suction cup positioned at the second end of the frame; and
   a section-cup activator coupled to the second end of the frame and to the suction cup, the suction-cup activator including a lifter engaged with the frame, a cam engaged with the lifter, and a stem coupled to the suction cup and to the cam along an axis,
   wherein the lifter and the cam are each formed to define complementary non-circular, sloped surfaces configured to engage with one another to translate rotation of the lifter into axial movement of the cam and stem relative to the frame to drive the suction cup toward the frame as the lifter rotates from an unlocked position to a locked position,
   wherein the lifter includes a support plate and a bowl coupled to the support plate, wherein the cam includes a channel and a face coupled to the channel, and wherein the face of the cam engages with the bowl of the lifter.

5. The mount of claim 4, further comprising a pin received in the channel of the cam and extending through a portion of the stem to connect the stem with the cam.

6. The mount of claim 4, wherein a seat is formed into the bowl, and wherein the seat is configured to engage with the face of the cam when the lifter is moved to the locked position to hold the lifter in the locked position at the selection of a user.

7. The mount of claim 1, wherein the frame includes a frame-member and a base coupled to the frame member, and wherein the base includes a rim and a cap wall extending from the rim.

8. The mount of claim 7, wherein the lifter engages with the cap wall of the base and the suction cup engages with the rim on an opposing side of the base from the lifter.

9. The mount of claim 1, further comprising a grip coupled to the lifter for rotation with the lifter relative to the frame and a rotation stop coupled to the frame, and wherein the rotation stop is configured to engage with the grip to limit rotation of the lifter between the locked and unlocked positions.

10. The mount of claim 9, wherein the grip the and lifter can rotate about 90 degrees relative to the frame from unlocked position to the locked position.

11. A mount comprising:
    a frame having a first end and a spaced apart second end;
    a head coupled to the first end of the frame, the head adapted to attached with a case of a handheld electronic device;
    a suction cup positioned at the second end of the frame; and
    a section-cup activator coupled to the second end of the frame and to the suction cup, the suction-cup activator including a lifter engaged with the frame, a cam engaged with the lifter, and a stem coupled to the suction cup and to the cam along an axis,
    wherein the lifter and the cam are each formed to define complementary non-circular, sloped surfaces configured to engage with one another to translate rotation of the lifter into axial movement of the cam and stem relative to the frame to drive the suction cup toward the frame as the lifter rotates from an unlocked position to a locked position,
    wherein the surfaces of the lifter and the cam are oblong and frustoconical.

12. A suction-cup activator for moving a suction cup relative to a frame of a mount, the suction-cup activator comprising:
    a lifter engaged with the frame;
    a cam engaged with the lifter; and
    a stem coupled to the suction cup and to the cam along an axis;
    wherein the lifter and the cam are each formed to define complementary non-circular, sloped surfaces configured to engage with one another to translate rotation of the lifter into axial movement of the cam and stem relative to the frame to drive the suction cup toward the frame as the lifter rotates from an unlocked position to a locked position,
    wherein the lifter includes a support plate and a bowl coupled to the support plate, wherein the cam includes a channel and a face coupled to the channel, and wherein the face of the cam engages with the bowl of the lifter.

13. The suction-cup activator of claim 12, wherein the stem includes a foot and a post extending from the foot, and wherein the foot is coupled to the suction cup and the post extends at least partially through the frame.

14. The suction-cup activator of claim 13, wherein the post is formed to define a non-circular contour configured to engage with the frame to block rotation of the stem relative to the frame.

15. The suction-cup activator of claim 12, further comprising a pin received in the channel of the cam and extending through a portion of the stem to connect the stem with the cam.

16. The suction-cup activator of claim 12, wherein a seat is formed into the bowl, and wherein the seat is configured to engage with the face of the cam when the lifter is moved to the locked position to hold the lifter in the locked position at the selection of a user.

17. A suction-cup activator for moving a suction cup relative to a frame of a mount, the suction-cup activator comprising:
 a lifter engaged with the frame;
 a cam engaged with the lifter; and
 a stem coupled to the suction cup and to the cam along an axis;
 wherein the lifter and the cam are each formed to define complementary non-circular, sloped surfaces configured to engage with one another to translate rotation of the lifter into axial movement of the cam and stem relative to the frame to drive the suction cup toward the frame as the lifter rotates from an unlocked position to a locked position,
 wherein the surfaces of the lifter and the cam are oblong and frustoconical.

* * * * *